(12) United States Patent
Chou

(10) Patent No.: US 7,974,528 B2
(45) Date of Patent: Jul. 5, 2011

(54) IMAGE STABILIZING CAMERA SYSTEM

(75) Inventor: Tai-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/639,151

(22) Filed: Dec. 16, 2009

(65) Prior Publication Data

US 2010/0316363 A1      Dec. 16, 2010

(30) Foreign Application Priority Data

Jun. 10, 2009   (CN) .......................... 2009 1 0303118

(51) Int. Cl.
*G03B 17/00* (2006.01)
*H04N 5/228* (2006.01)
(52) U.S. Cl. ..................................... 396/55; 348/208.11
(58) Field of Classification Search .................... 396/55; 348/208.11
See application file for complete search history.

(56) References Cited

U.S. PATENT DOCUMENTS

2010/0080545 A1 *   4/2010   Fan et al. ........................ 396/55

* cited by examiner

*Primary Examiner* — Rodney E Fuller
(74) *Attorney, Agent, or Firm* — Raymond J. Chew

(57) ABSTRACT

An exemplary image stabilizing camera system includes a camera module. The camera module includes a movable AF unit, a frame having a receiving cavity defined therein, an electromagnetic driving unit, and an elastic member. The receiving cavity is configured for receiving the movable AF unit therein. The electromagnetic driving unit is configured for driving the movable AF unit to move relative to the frame so as to counteract movement of the object relative to the system such that the system can, after a shake of the system, capture a stabilized image of the object which is substantially identical with an image thereof captured without the shake of the system. The elastic member is disposed on a top end of the movable AF unit. The elastic member is configured for connecting the movable AF unit to the frame, thereby suspending the movable AF unit in the receiving cavity.

20 Claims, 6 Drawing Sheets

IMAGE STABILIZING CAMERA SYSTEM

BACKGROUND

1. Technical Field

The present disclosure relates to camera systems, and particularly to an anti-vibration camera system.

2. Description of Related Art

In normal use of a camera, light rays coming from an object transmit through the camera and fall on a particular region of a image sensor. The image sensor forms an optical image associated with the object at a first position.

However, while the optical image is being captured, the camera may shake due to hand-held shooting. As a result, the camera may move slightly relative to the object. In such case, the light rays from the object may fall on a different region of the image sensor. That is, the image sensor may form an optical image associated with the object at a second position, resulting in a blurry optical image.

Therefore, a new image stabilizing camera system is desired to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
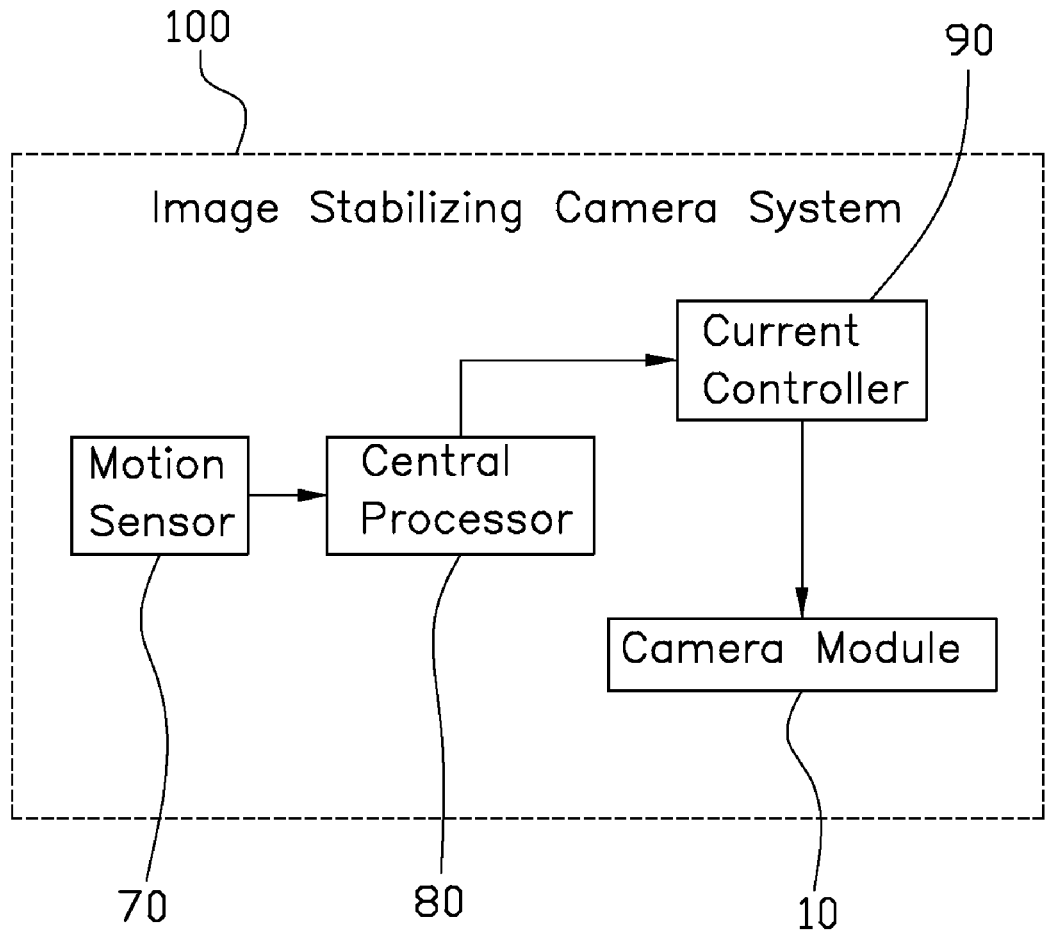
FIG. 1 is a block diagram of an image stabilizing camera system for stabilizing an optical image during use according to a first embodiment, the image stabilizing camera system including a camera module.

Referring to FIG. 1, an image stabilizing camera system 100, in accordance with a first embodiment, is shown. The system 100 includes a camera module 10, a motion sensor 70, a central processor 80 electrically connected to the motion sensor 70, and a current controller 90 electrically connected to the central processor 80.

Figure 2:
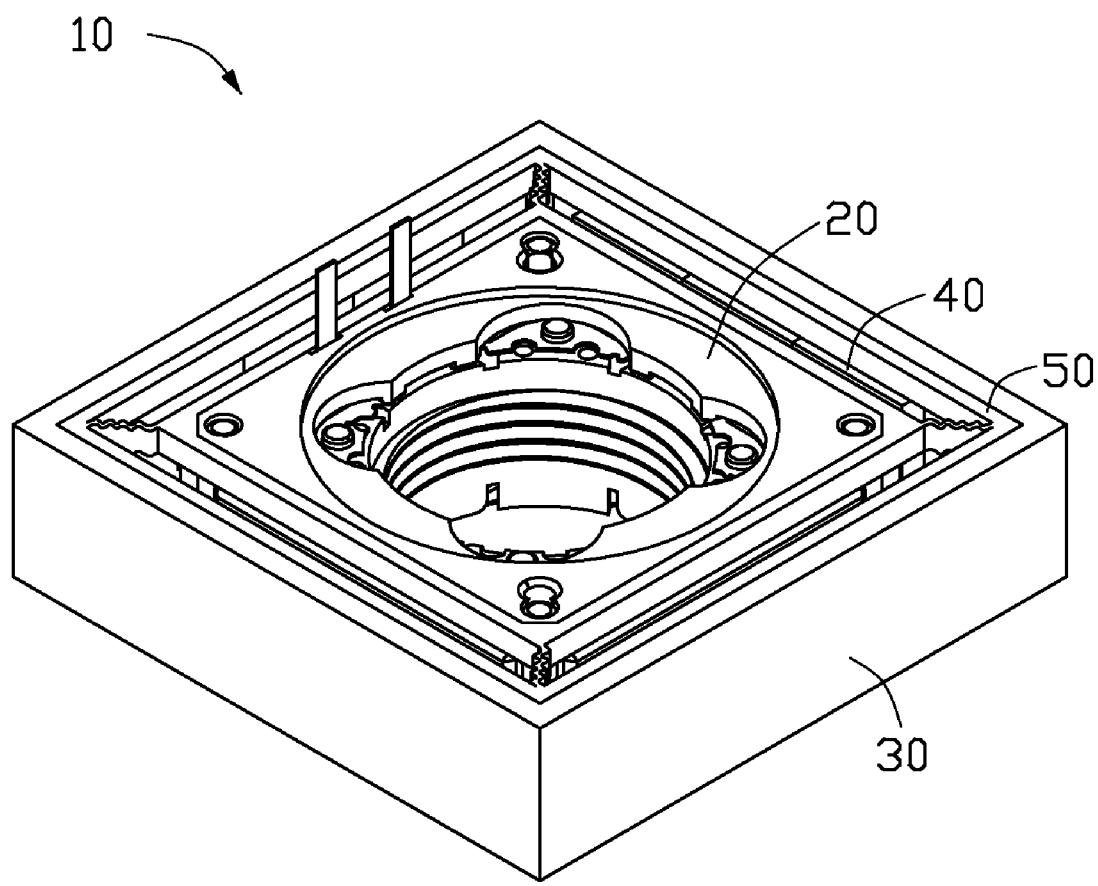
FIG. 2 is an isometric view of the camera module of FIG. 1.
Figure 3:
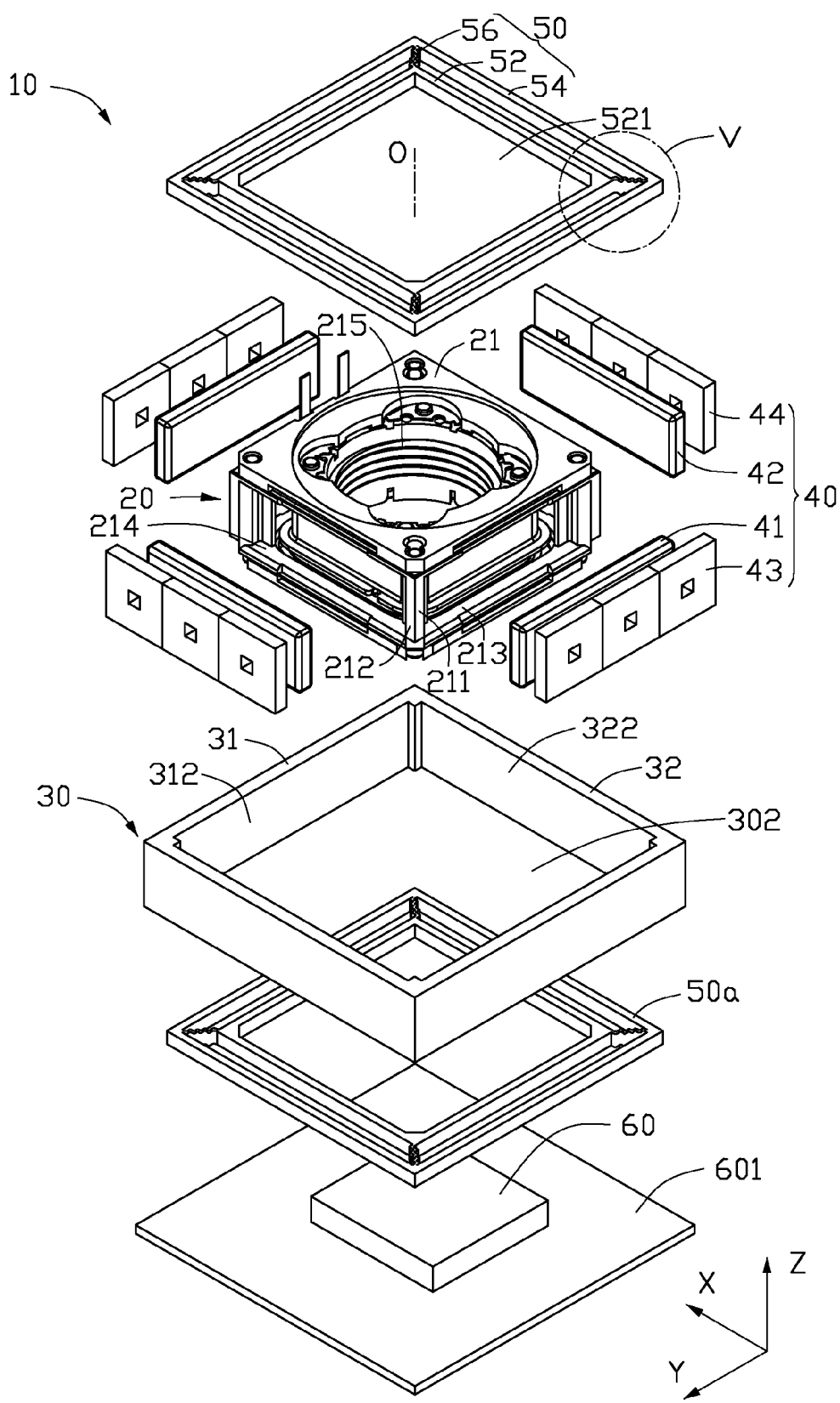
FIG. 3 is an exploded, isometric view of the camera module of FIG. 2, the camera module including a first magnetic member and an electromagnetic member.

Referring to FIGS. 2-3, a camera module 10, includes a movable auto-focus (AF) unit 20, a frame 30, an electromagnetic driving unit 40, a top elastic member 50, a bottom elastic member 50a, a printed circuit board 601, and an image sensor 60 mounted on the printed circuit board 601. The printed circuit board 601 is securely mounted on a main body (not shown) of the system 100.

The movable AF unit 20 is substantially cubic. The movable AF unit 20 includes a movable AF actuator 21, and a lens module having at least one lens.

The movable AF actuator 21 is configured for driving the at least one lens to move along an optical axis of the at least one lens for focusing. In the present embodiment, the movable AF actuator 21 is a voice coil motor. In other embodiments, the movable AF actuator 21 may instead be some other type of actuator, such as a step motor, a piezoelectric motor etc. The movable AF actuator 21 includes two opposite first sidewalls 211, and two opposite second sidewalls 212 fastened to one another by a dovetail panel joint. The first sidewalls 211 parallel the Y axis shown in FIG. 1, and respectively define a first receiving cavity 213 therein. The second sidewalls 212 parallel the X axis shown in FIG. 1, and respectively define a second receiving cavity 214 therein. The movable AF actuator 21 has a through hole 215 defined at the center thereof for receiving the at least one lens therein.

The frame 30 is substantially cubic. The frame 30 is securely mounted on the main body of the system 100, and is above the printed circuit board 601. The frame 30 includes two opposite first sidewalls 31, and two opposite second sidewalls 32 fastened to one another by a dovetail panel joint. The first sidewalls 31 parallel the Y axis shown in FIG. 1. The second sidewalls 32 parallel the X axis shown in FIG. 1. The first sidewalls 31 and the second sidewalls 32 cooperatively define a receiving cavity 302 for receiving the movable AF unit 20 therein. The first sidewalls 31 respectively have a first inner wall 312. The second sidewalls 22 respectively have a second inner wall 322. In the present embodiment, the frame 30 is made of ferronickel alloy, such that the electromagnetic driving unit 40 cannot be affected by an external electromagnetic field generated by other electromagnetic elements when the electromagnetic driving unit 40 is in use. In other embodiments, the frame 30 may instead be made of other electromagnetic shielding material, such as electrically conductive plastic, surface conductive material, electrically conductive glass etc.

The electromagnetic driving unit 40 is configured for driving the movable AF unit 20 to move relative to the frame 30 to compensate a movement of the system 100 based on/associated with a motion detection result/signals of the motion sensor 70, thereby eliminating/reducing blur. The electromagnetic driving unit 40 includes two opposite first magnetic members 41, two opposite second magnetic members 42, two opposite first electromagnetic members 43 electrically connected to the current controller 90, and two opposite second electromagnetic members 44 electrically connected to the current controller 90.

The first magnetic members 41 are securely received in the first receiving cavities 213, respectively. The second members 42 are securely received in the receiving cavities 214, respectively.

The first electromagnetic members 43 are securely mounted on the respective first inner walls 312. The first electromagnetic member 43 are respectively opposite to the first magnetic members 41, such that the first magnetic members 41 can move along the Y axis when the first electromagnetic members 43 are supplied with electric currents, thereby driving the movable AF actuator 21 to move along the Y axis. The second electromagnetic members 44 are securely mounted on the respective second inner walls 322. The second electromagnetic member 44 are respectively opposite to the second magnetic members 42, such that the second magnetic members 42 can move along the X axis when the second electromagnetic members 44 are supplied with electric currents, thereby driving the movable AF unit 20 to move along the X axis.

Figure 4:
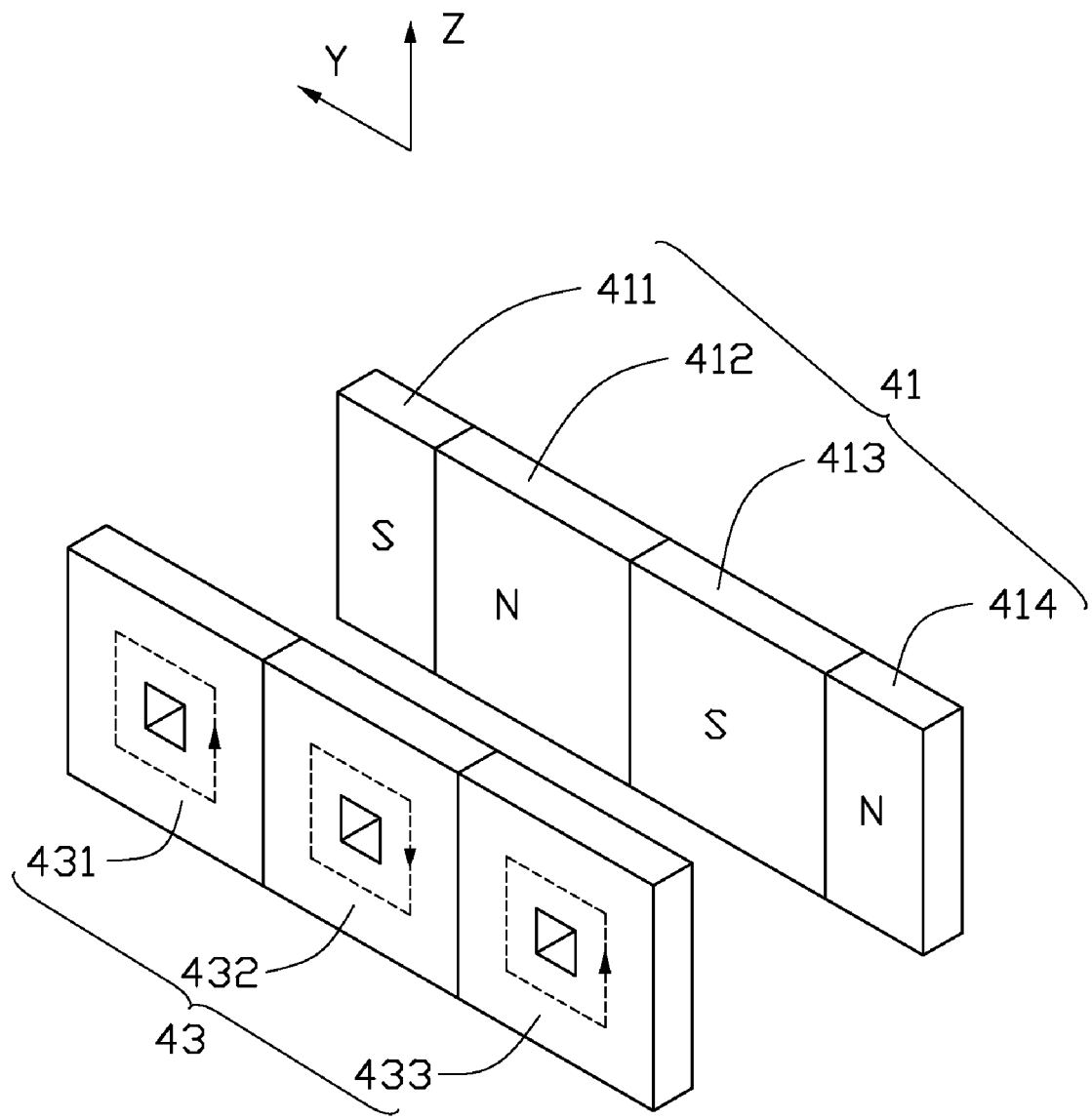
FIG. 4 is an isometric view of the first magnetic member and the electromagnetic member.

In the present embodiment, referring to FIG. 4, each first magnetic member 41 includes a quadrupole magnet, and each first electromagnetic member 43 includes a first coil 431, a second coil 432, and a third coil 433 all arranged along the Y axis. The quadrupole magnet of each first magnetic member 41 includes a first magnetic component 411, a second magnetic component 412, a third magnetic component 413, and a fourth magnetic component 414. The first, second, third, and fourth magnetic components 411, 412, 413, 414 are set out in an arrangement of alternate south and north magnetic poles arranged along the Y axis. In FIG. 4 the first magnetic component 411 is opposite to a left portion of the first coil 431. The second magnetic component 412 is opposite to a right portion of the first coil 431 and a left portion of the second coil 432. The third magnetic component 413 is opposite to a right portion of the second coil 432 and a left portion of the third coil 433. The fourth magnetic component 414 is opposite to a right portion of the third coil 434.

When the three coils 431, 432, 433 are respectively supplied with alternate clockwise and anti-clockwise electric currents (see FIG. 4) flowing therethrough, the first magnetic member 41 moves along the Y axis due to a magnetic force between the first magnetic member 41 and the first electromagnetic member 43 supplied with electric currents, thereby driving the movable AF unit 20 to move along the Y axis.

For ease of manufacture, the structure of each second magnetic member 42 and each second electromagnetic member 44 are the same as that of each first magnetic member 41 and each first electromagnetic member 43, respectively. For ease of control, the arrangement of magnets of each second magnetic member 42 and the supply of electric currents of each second electromagnetic member 44 are the same as that of each first magnetic member 41 and each first electromagnetic member 43, respectively. Therefore, when three coils of wire of the second electromagnetic member 44 are respectively supplied with electric currents, the second magnetic member 42 moves along X axis due to a magnetic force between the second magnetic member 42 and the second electromagnetic member 44 supplied with electric currents, thereby driving the movable AF unit 20 to move along the X axis. Therefore, if the first electromagnetic members 43, and the second electromagnetic members 44 are supplied with electric currents as needed according to the motion detection result of the motion sensor 70, the movable AF unit 20 can move in a plane parallel to the X-Y plane defined by the X and Y axes.

The top elastic member 50 is disposed on a top end of the movable AF unit 20. The top elastic member 50 is configured for connecting the movable AF unit 20 to the frame 30, such that the movable AF unit 20 is suspended in the receiving cavity 302. The top elastic member 50 includes an inner frame 52 having a through hole 521 defined therein for allowing light to pass therethrough, an outer frame 54 coaxial with the inner frame 52, and four micro-springs 56 interposed between the inner and outer frames 52, 54.

The inner frame 52 is substantially cubic, and is securely mounted on the top surface of the movable AF unit 20. In the present embodiment, the inner frame 52 is securely glued (i.e., adhesively mounted) to the top surface of the movable AF unit 20, and is coaxial with the movable AF unit 20.

The outer frame 54 is substantially cubic, and is securely mounted on the top end of the frame 30. In the present embodiment, the outer surface of the outer frame 52 is securely glued (i.e., adhesively mounted) to the inner surface of the frame 30. In other embodiments, the bottom surface of the outer frame 52 may instead be securely glued to the top surface of the frame 30.

Each of the micro-springs 56 is interconnected between the inner frame 52 and the outer frame 54, such that the movable AF unit 20 is suspended in the receiving cavity 302. In the present embodiment, the micro-springs 56 are arranged at four respective corners of the outer frame 54. In alternative embodiments, the micro-springs 56 may instead be respectively interposed between each two opposite and adjacent sides of the inner and outer frames 52, 54.

Figure 5:
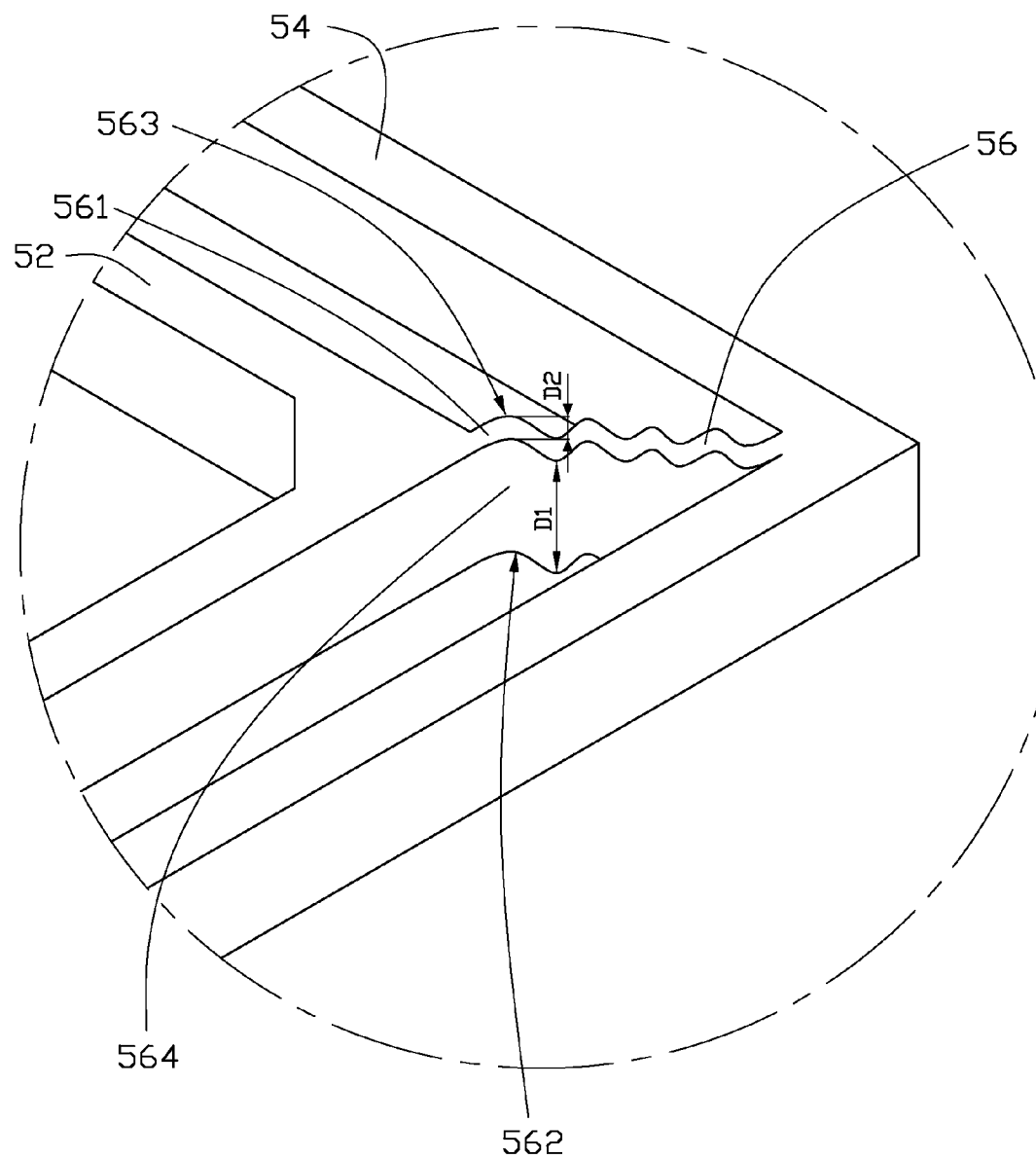
FIG. 5 is an enlarged view of the circled portion V of FIG. 3.

Referring also to FIG. 5, each micro-spring 56 includes a top surface 561, a bottom surface 562 opposite to the top surface 561, a first side-surface 563, and a second side-surface 564 opposite to the first side-surface 563. Two sides of each of the opposite top and bottom surfaces 561, 562 respectively abut against the first and second side-surfaces 563, 564. The top and bottom surfaces 561, 562 are perpendicular to a central axis O (see FIG. 3) of the inner frame 52. The first and second side-surfaces 563, 564 are parallel the central axis O of the inner frame 52, and are substantially flexuous. In the present embodiment, a distance D1 between the top and bottom surfaces 561, 562 is in a range from 50 micrometers to 200 micrometers, and a distance D2 between the first and second side-surfaces 563, 564 is in a range from 5 micro meters micrometers to 50 micrometers.

In alternative embodiments, D1/D2 may be in a range from 1 to 100, such that each micro-spring 56 has better elasticity. In other alternative embodiments, D1/D2 may be more than or equal to 4, such that the movable AF unit 20 actuated by the electromagnetic driving unit 40 only move in the X-Y plane. In yet still other alternative embodiments, D1/D2 may be less than or equal to 20, such that each micro-spring 56 has better rigidity to suspend the movable AF unit 20.

The top elastic member 40 is made of monocrystalline silicon by a process using reactive ion etching. In alternative embodiments, the top elastic member 40 may instead be made of other semiconductor material or metal material, such as polycrystalline silicon, silicon dioxide, silicon carbide, copper, etc. In other alternative embodiments, the top elastic member 40 may instead be made by other etching method, such as deep reactive ion etching, lithography electroforming and molding, etc.

The bottom elastic member 50a is disposed on a bottom end of the movable AF unit 20. For ease of manufacture, the structure and material of the bottom elastic member 50a is the same as that of the top elastic member 50. In other embodiments, the bottom elastic member 50a may be omitted.

The image sensor 60 is electrically connected to the printed circuit supporting board 601, and is surrounded by the frame 30. The image sensor 60 is configured for converting an optical image to an electrical signal.

In operation, at the beginning of capturing an optical image with the system 100, there are no currents supplied in the first electromagnetic members 43, 44. At this moment, the system 100 forms an optical image of an object (not shown) on a first position of the image sensor 60.

Referring back to FIG. 1, while the optical image is being captured, the system 100 may shake due to hand-held shooting. The shake may cause the system 100 to move along the plus-direction of the X axis relative to the object, for example. The motion sensor 70 detects movement of the system 100, and sends a motion detection result to the central processor 80.

Based on the motion detection result from the motion sensor 70, the central processor 80 computes a compensating adjustment for the movable AF unit 20 in order to reposition the optical image on the first position of the image sensor 60, and generates an image stabilizing signal based on/associated with the compensating adjustment. For example, the movable AF unit 20 may need to move a computed compensating distance along the X axis. Then the central processor 80 sends the image stabilizing signal to the current controller 90; and the current controller 90 controls the currents supplied to the second electromagnetic members 44 in response to the image stabilizing signal, thereby driving the movable AF unit 20 to move along the X axis. As a result, the system 100 forms an optical image of the object (not shown) on the first position of the image sensor 60. That is, the optical image is formed on the same position of the image sensor 60 before and during the time the anti-shake camera 10 is shaken. Accordingly, a blurred optical image is avoided.

Figure 6:
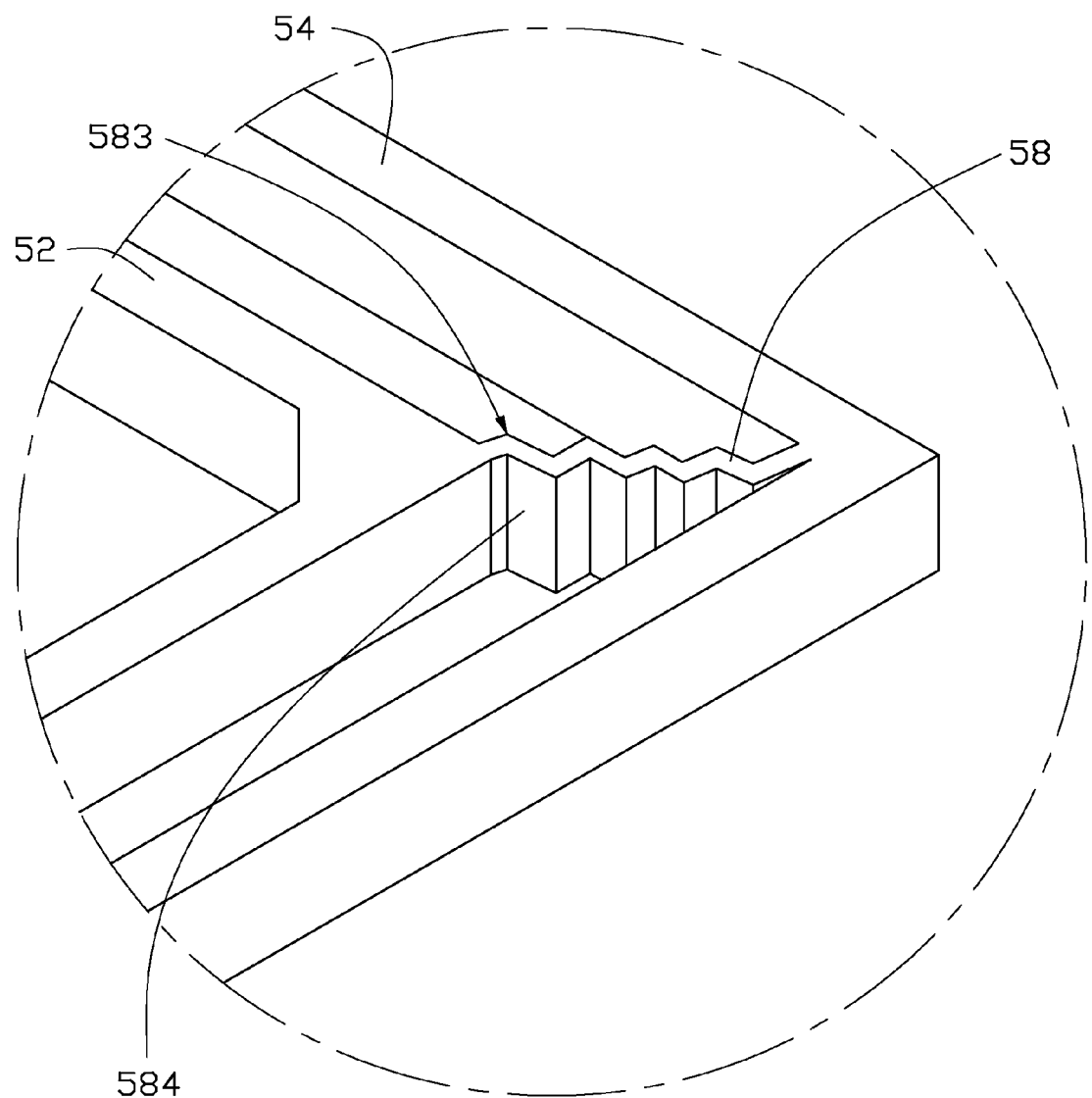
FIG. 6 is an isometric view of a micro-spring according to a second embodiment.

Referring to FIG. 6, a micro-spring 58 interconnected between the inner frame 52 and the outer frame 54, in accordance with a second embodiment, is shown. Most of the structure of the micro-spring 58 is similar to that of the micro-spring 56, except that, the first and second side-surfaces 583, 584 paralleling each other are substantially zigzagged.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. An image stabilizing camera system comprising:
   a camera module, the camera module comprising a movable auto-focus (AF) unit, a frame having a receiving cavity defined therein, an electromagnetic driving unit, and an elastic member, the movable AF unit comprising a voice coil motor, the receiving cavity receiving the movable AF unit therein, the elastic member being disposed on a top end of the movable AF unit, and the elastic member interconnected between the movable AF unit and the frame, thereby suspending the movable AF unit in the receiving cavity;
   a motion sensor for detecting a movement of the image stabilizing camera system;
   a central processor electrically connected to the motion sensor, the central processor being configured for computing a compensate movement adjustment for the movable AF unit based on a motion detection result of the motion sensor, and generating an image stabilizing signal associated therewith; and
   a current controller electrically connected to the central processor and the electromagnetic driving unit, the current controller being configured for receiving the image stabilizing signal, and controlling the electromagnetic driving unit to drive the movable AF unit to move relative to the frame, thereby compensating a movement of the image stabilizing camera system.

2. The camera system of claim 1, wherein the movable AF unit is cubic, and comprises two opposite first sidewalls and two opposite second sidewalls, each of the first sidewalls of the movable AF unit defines a first receiving cavity, the frame is cubic, and comprises two opposite first sidewalls and two opposite second sidewalls, and the first sidewalls and the second sidewalls of the frame cooperatively define the receiving cavity for receiving the movable AF unit therein.

3. The camera system of claim 2, wherein the electromagnetic driving unit comprises two opposite first magnetic members, and two opposite first electromagnetic members electrically connected to the current controller, the first magnetic members are received in the first receiving cavities, respectively, the first electromagnetic members are mounted on two inner walls of the respective first sidewalls of the frame, and the first electromagnetic members are respectively opposite to the first magnetic members, such that the first magnetic members can move when the first electromagnetic members are supplied with electric currents, thereby driving the movable AF unit to move.

4. The camera system of claim 3, wherein each first magnetic member comprises a quadrupole magnet, and each first electromagnetic member comprises a first coil, a second coil, and a third coil, the quadrupole magnet of each first magnetic member comprises a first magnetic component, a second magnetic component, a third magnetic component, and a fourth magnetic component, the four magnetic components are set out in an arrangement of alternate south and north magnetic poles, the first magnetic component is opposite to a left portion of the first coil, the second magnetic component is opposite to a right portion of the first coil and a left portion of the second coil, the third magnetic component is opposite to a right portion of the second coil and a left portion of the third coil, and the fourth magnetic component is opposite to a right portion of the third coil.

5. The camera system of claim 4, wherein the first coil, the second coil, and the third coil of the first electromagnetic member are configured for respectively flowing having alternating alternate clockwise and anti-clockwise electric currents flowing therethrough, whereby the first magnetic members can move due to a magnetic force between the first magnetic member and the first electromagnetic member, thereby driving the movable AF unit to move.

6. The camera system of claim 5, wherein the elastic member comprises an inner frame having a through hole defined therein for allowing light to pass therethrough, an outer frame coaxial with the inner frame, and a plurality of micro-springs interposed between the inner and outer frames.

7. The camera system of claim 6, wherein each micro-spring comprises a top surface, a bottom surface opposite to the top surface, a first side-surface, and a second side-surface opposite to the first side-surface, and two sides of each of the opposite top and bottom surfaces respectively abut against the first and second side-surfaces.

8. The camera system of claim 7, wherein the top and bottom surfaces are perpendicular to a central axis of the inner frame, and the first and second side-surfaces are parallel the central axis of the inner frame.

9. The camera system of claim 8, wherein the first and second side-surfaces are flexuous or zigzagged.

10. The camera system of claim 8, wherein a distance D1 between the top and bottom surfaces is in a range from 50 micrometers to 200 micrometers, and a distance D2 between the first and second side-surfaces is in a range from 5 micrometers to 50 micrometers.

11. The camera system of claim 10, wherein D1/D2 is in a range from 1 to 100.

12. The camera system of claim 10, wherein D1/D2 is more than or equal to 4.

13. The camera system of claim 10, wherein D1/D2 is less than or equal to 20.

14. An image stabilizing camera system for capturing an optical image of an object, the image stabilizing camera system comprising:
   a camera module, the camera module comprising a movable auto-focus (AF) unit, a frame having a receiving cavity defined therein, an electromagnetic driving unit, an elastic member, and an image sensor for converting the optical image to an electrical signal, the movable AF unit comprising a voice coil motor, the receiving cavity being for receiving the movable AF unit therein, the elastic member being disposed on a top end of the movable AF unit, and the elastic member connecting the movable AF unit to the frame, thereby suspending the movable AF unit in the receiving cavity;
   a motion sensor for detecting a movement of the image stabilizing camera system;

a central processor electrically connected to the motion sensor, the central processor being configured for computing a compensate adjustment for the movable AF unit based on a motion detection result of the motion sensor, and generating an image stabilizing signal associated with the compensating adjustment; and a current controller electrically connected to the central processor and the electromagnetic driving unit, the current controller being configured for receiving the image stabilizing signal, and controlling the electromagnetic driving unit to drive the movable AF unit to move relative to the frame, such that the image stabilizing camera system forms the optical image of the object on an identical position of the image sensor before and after a shake of the image stabilizing camera system.

15. The camera system of claim 14, wherein the movable AF unit is cubic, and comprises two opposite first sidewalls and two opposite second sidewalls, each of the first sidewalls of the movable AF unit defines a first receiving cavity, the frame is cubic, and comprises two opposite first sidewalls and two opposite second sidewalls, and the first sidewalls and the second sidewalls of the frame cooperatively define the receiving cavity for receiving the movable AF unit therein.

16. The camera system of claim 15, wherein the electromagnetic driving unit comprises two opposite first magnetic members, and two opposite first electromagnetic members electrically connected to the current controller, the first magnetic members are received in the first receiving cavities, respectively, the first electromagnetic members are mounted on two inner walls of the respective first sidewalls of the frame, and the first electromagnetic members are respectively opposite to the first magnetic members, such that the first magnetic members can move when the first electromagnetic members are supplied with electric currents, thereby driving the movable AF unit to move.

17. An image stabilizing camera system for capturing an optical image of an object, the image stabilizing camera system comprising:

a camera module, the camera module comprising a movable auto-focus (AF) unit, a frame having a receiving cavity defined therein, an electromagnetic driving unit, and an elastic member, the movable AF unit comprising a voice coil motor, the receiving cavity being for receiving the movable AF unit therein, and the electromagnetic driving unit configured for driving the movable AF unit to move relative to the frame so as to counteract movement of the object relative to the image stabilizing camera system such that the image stabilizing camera system can, after a shake of the image stabilizing camera system, capture a stabilized image of the object which is substantially identical with an image thereof captured without the shake of the image stabilizing camera system, the elastic member being disposed on a top end of the movable AF unit, and the elastic member connecting the movable AF unit to the frame, thereby suspending the movable AF unit in the receiving cavity.

18. The camera system of claim 17, wherein the movable AF unit is cubic, and comprises two opposite first sidewalls and two opposite second sidewalls, each of the first sidewalls of the movable AF unit defines a first receiving cavity, the frame is cubic, and comprises two opposite first sidewalls and two opposite second sidewalls, and the first sidewalls and the second sidewalls of the frame cooperatively define the receiving cavity for receiving the movable AF unit therein.

19. The camera system of claim 18, wherein the electromagnetic driving unit comprises two opposite first magnetic members, and two opposite first electromagnetic members electrically connected to the current controller, the first magnetic members are received in the first receiving cavities, respectively, the first electromagnetic members are mounted on two inner walls of the respective first sidewalls of the frame, and the first electromagnetic members are respectively opposite to the first magnetic members, such that the first magnetic members can move when the first electromagnetic members are supplied with electric currents, thereby driving the movable AF unit to move.

20. The camera system of claim 19, wherein each first magnetic member comprises a quadrupole magnet, and each first electromagnetic member comprises a first coil, a second coil, and a third coil, the quadrupole magnet of each first magnetic member comprises a first magnetic component, a second magnetic component, a third magnetic component, and a fourth magnetic component, the four magnetic components are set out in an arrangement of alternate south and north magnetic poles, the first magnetic component is opposite to a left portion of the first coil, the second magnetic component is opposite to a right portion of the first coil and a left portion of the second coil, the third magnetic component is opposite to a right portion of the second coil and a left portion of the third coil, and the fourth magnetic component is opposite to a right portion of the third coil.

* * * * *